United States Patent [19]
Matsumura

[11] 4,449,959
[45] May 22, 1984

[54] CROSS GROOVED BANDED DRIVE BELT
[75] Inventor: Kaname Matsumura, Akashi, Japan
[73] Assignee: Mitsuboshi Belting Ltd., Kobe, Japan
[21] Appl. No.: 196,111
[22] Filed: Oct. 10, 1980
[51] Int. Cl.³ .............................. F16G 5/00; F16G 5/20
[52] U.S. Cl. ..................................... 474/238; 474/250; 474/262
[58] Field of Search ............... 474/265, 266, 267, 271, 474/153, 150, 261, 262, 263, 264, 111, 238, 249, 250, 251, 252; 156/135

[56] References Cited
U.S. PATENT DOCUMENTS

| | | | |
|---|---|---|---|
| 2,802,511 | 8/1957 | Waugh | 474/250 |
| 2,941,413 | 6/1960 | Huber | 474/250 |
| 3,564,933 | 2/1971 | Clinkenbeard | 474/262 |
| 3,626,776 | 12/1971 | Gentry | 474/111 |
| 3,853,017 | 12/1974 | White, Jr. et al. | 474/271 |
| 3,948,113 | 4/1976 | Stork | 474/238 |
| 4,002,082 | 1/1977 | Waugh | 474/250 |
| 4,011,766 | 3/1977 | Waugh | 474/250 |
| 4,264,314 | 4/1981 | Imamura | 474/250 |
| 4,299,587 | 10/1981 | Imamura | 474/267 |

Primary Examiner—John E. Murtagh
Attorney, Agent, or Firm—Wood, Dalton, Phillips, Mason & Rowe

[57] ABSTRACT

A cross-grooved banded drive belt wherein a plurality of V-belt elements are retained in laterally spaced relationship by a tie band. The V-belt elements are provided with transverse grooves which, in the illustrated embodiment, are aligned across the belt and arranged in sets spaced longitudinally of the belt. The grooves are asymmetrical in longitudinal section and in the illustrated embodiment, include planar, leading, and trailing surfaces. In the illustrated embodiment, the leading groove surfaces have a greater length than that of the trailing surfaces. As a result of the transverse alignment of the grooves of each set, the leading surfaces are effectively coplanar with each other and the trailing surfaces are effectively coplanar with each other. Illustrative ranges of the angularity of the groove surfaces are disclosed. In one form, the sets of grooves are uniformly longitudinally spaced, and in another form, the sets of grooves are randomly differently spaced.

20 Claims, 7 Drawing Figures

FIG. 1 PRIOR ART DRIVE SYSTEM
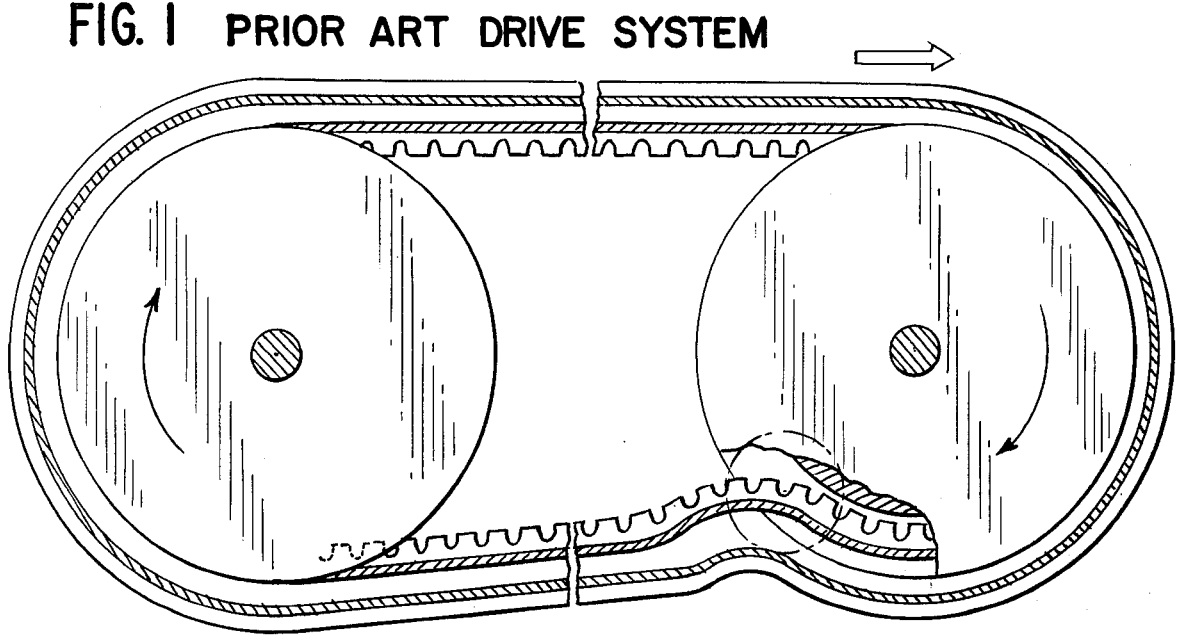
FIG. 2 PRIOR ART BELT SHOWING DEVELOPING CRACKS C, C', C"
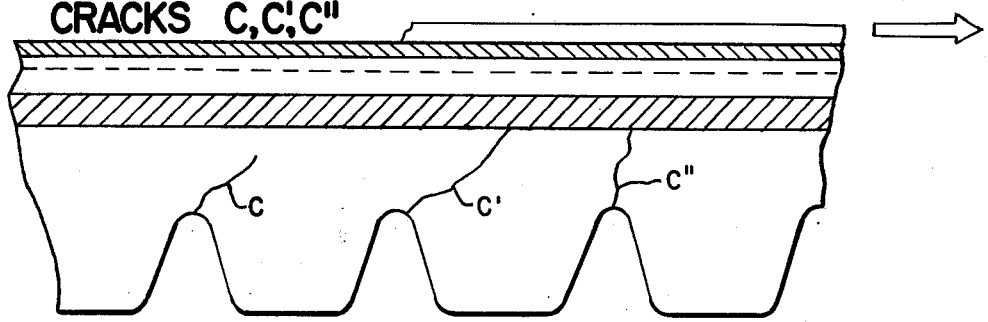
FIG. 3
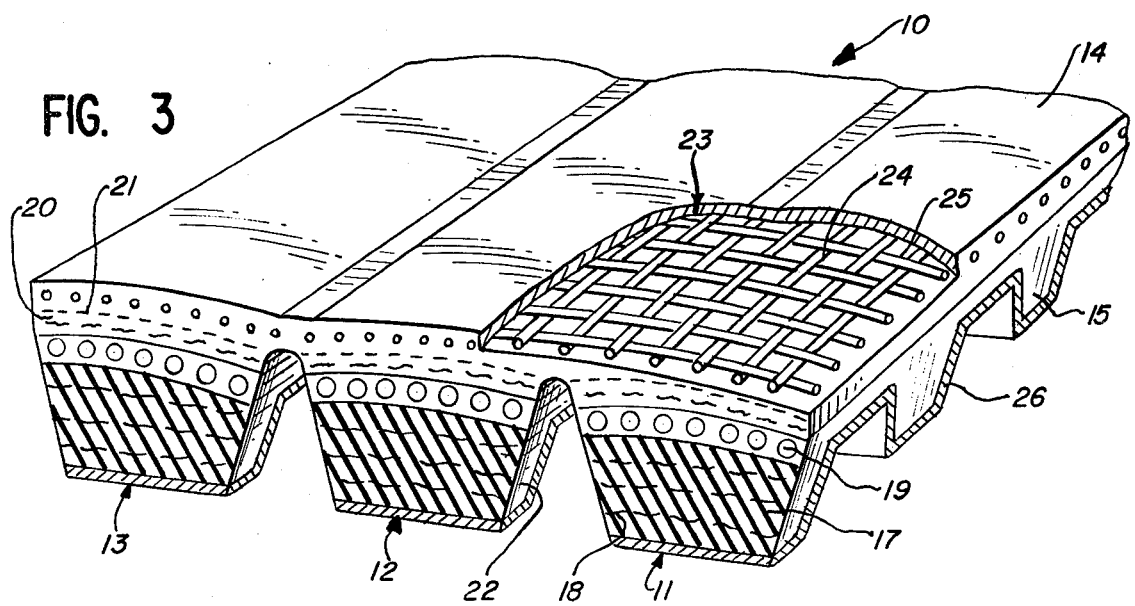

CROSS GROOVED BANDED DRIVE BELT

BACKGROUND OF THE INVENTION

1. Field of the Invention

This invention relates to power transmission belts and in particular to cross-grooved banded belts.

2. Description of the Background Art

In one conventional form of power transmission belt, a plurality of V-belt elements are retained in laterally spaced, parallel arrangement by a tie band. To provide improved flexibility in such tie band belts, transverse grooves have been provided in the distal portions of the V-belt elements. The present invention is concerned with an improved arrangement of the grooves of such a grooved banded belt manufacture.

More specifically, one form of cross-grooved banded belt is illustrated in U.S. Letters Pat. No. 2,802,511 of Dale L. Waugh. As shown therein, the V-belt elements are provided with transverse grooves which alternate from rib to rib in a staggered manner. Waugh teaches that the grooves should be disaligned so as to provide a greater area of contact between the belt and pulley at any given instant than would be provided if the grooves all lay in transverse alignment.

Donald E. Clinkenbeard, in U.S. Letters Pat. No. 3,564,933, shows a banded transmission belt wherein the V-belt elements are of the wrapped type and the tie band is provided with a bias cut reinforcing fabric.

K. V. Gentry shows, in U.S. Letters Pat. No. 3,626,775, a V-belt element having longitudinally symmetrical notches.

In U.S. Letters Pat. No. 3,853,017 of Jack D. White, Jr. et al, a power transmission belt is disclosed wherein the tie band is reinforced by a knitted fabric layer.

Delyn M. Stork discloses, in U.S. Letters Pat. No. 3,948,113, a power transmission belt wherein the V-belt elements are provided with transverse grooves which are illustrated as being segmentally cylindrical.

In U.S. Letters Pat. No. 4,011,766, Dale L. Waugh shows a power transmission belt similar to that of the Waugh U.S. Pat. No. 2,802,511 discussed above wherein the V-belt elements are provided with grooves which are staggered in the respective V-belt elements. The patentee again requires the staggered relation of the equal-sized teeth of the V-belt elements to assure that the belt is free of hinge points and points out that if the grooves were in transverse alignment between the V-belt elements, they would cause a reduced thickness hinge line to be formed in the belt which would weaken the belt.

One of the problems found in the grooved banded belts of the prior art is illustrated in FIGS. 1 and 2 of the drawing. Thus, as shown in FIG. 1, when such a transversely grooved banded belt is utilized for power transmission between a pair of pulleys, a number of different stresses and shearing forces are developed, tending to cause cracking of the belt, particularly from the root of the belt grooves, as illustrated in FIG. 2. As further shown in FIG. 1, a flexing of the belt occurs at the point where the belt leaves the driven pulley as the belt tends to remain in the annular grooves of the driven pulley both as a result of inertia and friction and, thus, is bent somewhat as it is pulled out of the grooves at a point beyond the tangent between the two pulleys, as illustrated in FIG. 1. This constant flexing of the belt at this point further tends to produce cracks, such as illustrated in FIG. 2. The proposed staggered arrangements of the belt grooves have not fully satisfactorily overcome the cracking problems and, thus, the different transversely grooved banded belts of the prior art have limited useful life.

SUMMARY OF THE INVENTION

The present invention comprehends an improved transversely grooved banded power transmission belt providing substantially improved useful life by effectively overcoming the problems of the above discussed prior art belts. Further, the improved belt construction of the present invention provides enhanced flexibility and strength, permitting the belt to be used on small diameter pulleys while concurrently effectively minimizing noise in the operation of the power transmission means.

In one broad aspect, the invention comprehends the provision of such a transversely grooved banded belt wherein the grooves are longitudinally asymmetrical.

Thus, in the illustrated embodiment, the leading surface of the groove differs from the trailing surface. In the illustrated embodiment, the leading surface is a planar surface extending at an angle to the longitudinal extent of the belt which is different from that of the planar surface defining the trailing surface of the groove. Resultingly, the leading surface has a longer extent than that of the trailing surface.

In the illustrated embodiment, the grooves of the respective laterally related V-belt elements are aligned in a plurality of sets spaced longitudinally of the belt. Thus, the leading surfaces of each set of grooves are coplanar and the trailing surfaces of each set of grooves are coplanar.

In the disclosed embodiment, the leading surface is inclined at an angle to the longitudinal extent of the belt in the range of approximately 30° to 75°, and the trailing surface is inclined at an angle to the longitudinal extent of the belt in the range of approximately 72° to 84°. Resultingly, a difference between the angles of the leading and trailing surfaces relative to the longitudinal extent of the belt as in the range of approximately 2° to 30° in defining the asymmetric configuration of the grooves.

The invention is advantageously adapted for use in such banded belts of the raw edge type, as well as the wrapped type. The invention is further advantageously adapted for use with such banded belts having different types of reinforcement both in the tie band and in the V-belt elements.

Thus, the invention comprehends an improved power transmission belt structure utilizing aligned transverse grooves in the V-belt elements having asymmetrical longitudinal configurations. The respective sets of grooves may be spaced uniformly along the longitudinal extent of the belt, or may be randomly differently spaced as desired within the scope of the invention.

The power transmission belt of the present invention is extremely simple and economical of construction while yet providing long, troublefree life as a result of the improved crack resistance.

BRIEF DESCRIPTION OF THE DRAWING

Other features and advantages of the invention will be apparent from the following description taken in connection with the accompanying drawing wherein:

FIG. 1 is a schematic illustration of a power transmission utilizing a transversely grooved belt illustrating the stresses and forces acting on the belt during power transmission which tend to cause failure of the belt;

FIG. 2 is a fragmentary longitudinal, enlarged section illustrating the formation of cracks in the belt resulting from the induced stresses;

FIG. 3 is a fragmentary perspective sectional view of one form of power transmission belt embodying the invention;

DESCRIPTION OF THE PREFERRED EMBODIMENTS

Figure 4:
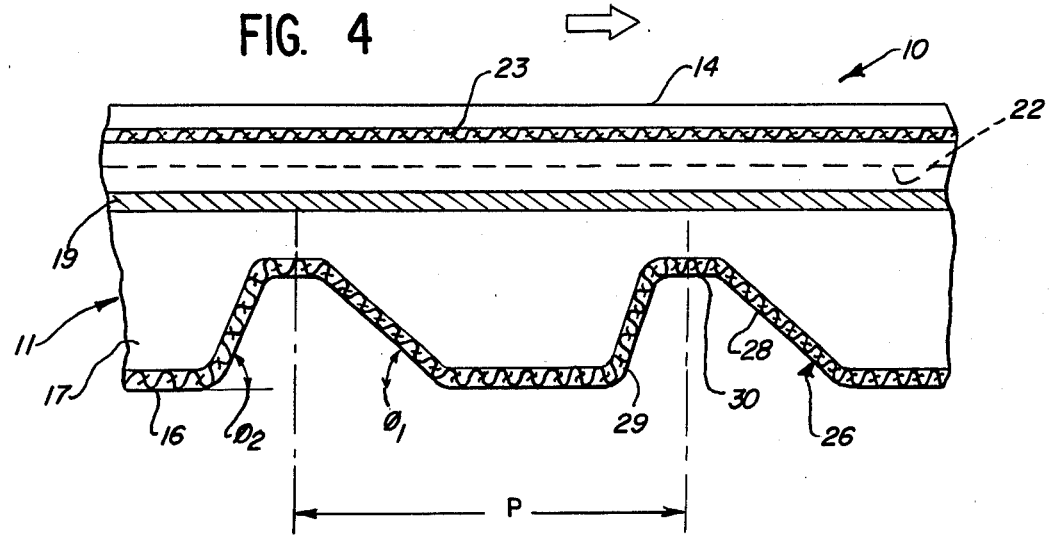
FIG. 4 is a fragmentary enlarged longitudinal section of the embod,iment of FIG. 3.

In the exemplary embodiments of the invention as disclosed in the drawing, a power transmission belt generally designated 10 is shown to comprise an improved banded belt structure including a plurality of V-belt elements 11, 12 and 13 retained in side-by-side laterally spaced relationship by a tie band 14.

In the embodiment of FIG. 3, the V-belt elements are raw edge elements illustratively formed of elastomeric material wherein the side surfaces 15 are uncovered while the distal, or bottom, surface is provided with a covering fabric layer 16.

As further illustrated in FIG. 3, each V-belt element may define a lowermost compression section 17 which illustratively may be provided with transversely extending short fibers 18. Outwardly of the compression section, the V-belt element is provided with a plurality of longitudinally extending tensile cords 19 and outwardly of the tensile cords, the V-belt element defines a tension section 20 which also may be provided with transversely extending short fibers 21.

The V-belt elements are spaced laterally apart in the belt 10 by the longitudinally extending grooves 22, which, as shown in FIG. 3, extend upwardly to the tension section 20. As shown, the grooves 22 define the raw edges 15 between the V-belts.

Tie band 14 may be provided with suitable fabric reinforcement 23 and, in the illustrated embodiment of FIG. 3, the fabric reinforcement is made up of cross yarns, or threads, 24 and 25. As is well known to those in the art, different forms of reinforcement fabric may be utilized in such tie bands. In the illustrated form, the warp threads 24 extend parallel to the longitudinal extent of the belt, whereas the woof threads 25 extend transversely thereto at right angles to the warp threads 24. In another suitable form for such reinforcing fabric, the reinforcing threads extend angularly to the longitudinal extent of the belt and may extend at an angle other than 90° to each other, such as in the range of 95° to 150°.

The belt 10 is formed primarily of suitable elastomeric material, such as rubber. The tie band reinforcing fabric may be formed of wind-shrunk warp threads formed of a synthetic fiber, such as a polyamide or polyester fiber. The woof threads may be formed of cotton fibers. In one form, the warp threads are retained parallel to the longitudinal extent of the belt by weak cotton woof threads.

Figure 5:
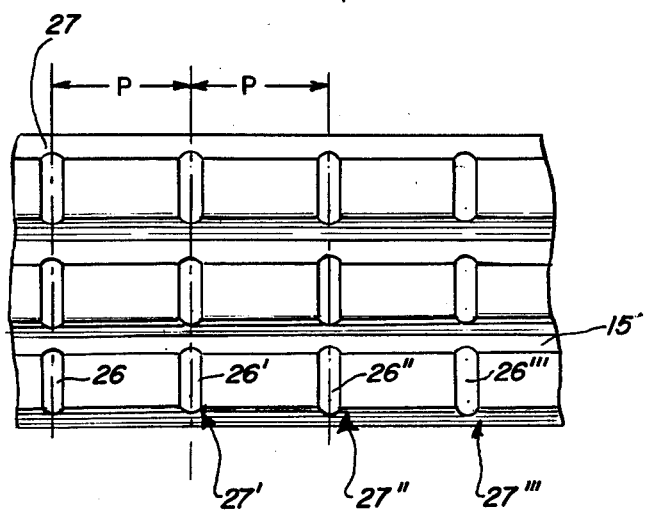
FIG. 5 is a fragmentary bottom plan view thereof.
Figure 6:
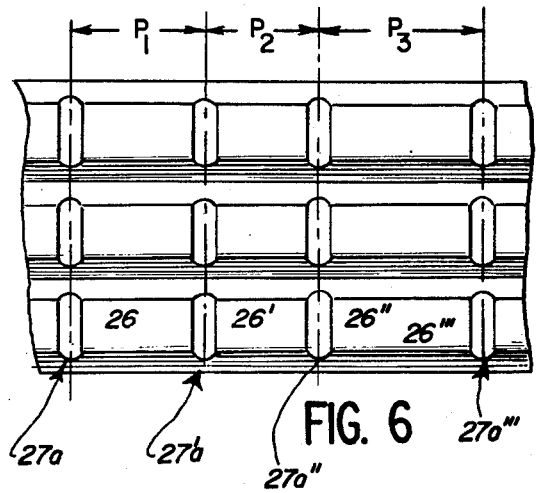
FIG. 6 is a fragmentary bottom plan view of a modified form thereof.

As indicated briefly above, the invention comprehends the provision of a plurality of transverse grooves in the distal portion of the V-belt elements and, more specifically, in the tension portion thereof. The grooves of the present invention are arranged in transverse alignment, as illustrated in FIGS. 5 and 6. As shown in FIG. 5, grooves 26 may be aligned in a first set 27, a second set 27' spaced from first set 27 by a pitch distance P, a third set 27" spaced from second set 27' by the same pitch distance P, and a fourth set 27'" spaced from third set 27" by the same pitch distance. The grooves of each set are aligned.

In FIG. 6, the sets 27a, 27a', 27a", and 27a'" of the grooves 26, 26', 26", and 26'", respectively, are spaced apart at randomly different distances, such as distances $P_1$, $P_2$, and $P_3$. However, the grooves of each set are aligned with the other grooves of that set similarly as in the embodiment of FIG. 5.

Referring now more specifically to FIG. 4, each groove 26 is defined by an inclined leading surface 28, an inclined trailing surface 29, and a flat bottom surface 30. Bottom surface 30 extends parallel to the flatwise extent of the belt. Leading surface 28 preferably extends at an angle to the flatwise extent, i.e., angle $\phi_1$, in the range of approximately 30° to 75°, and in the illustrated embodiment, extends at an angle of 60°. Trailing surface 29 preferably extends at an angle to the flatwise extent of the belt, i. e., angle $\phi_2$ in the range of approximately 72° to 84°, and in the illustrated embodiment, extends at an angle of approximately 80°.

As indicated above, the improved belt structure 10 provides improved long life and crack resistance as compared to the belt structures of the prior art. Illustratively, a belt manufactured in accordance with the above disclosed invention was tested against two prior art belt structures. The results of the comparative test are illustrated in the following table:

| Belt | A | B | C |
| --- | --- | --- | --- |
| Crack occurrence | 10,000 hrs. | 4,000 hrs. | 6,000 hrs. |
| Belt life (durability) | 15,000 hrs. | 8,000 hrs. | 11,000 hrs. |

Figure 7:
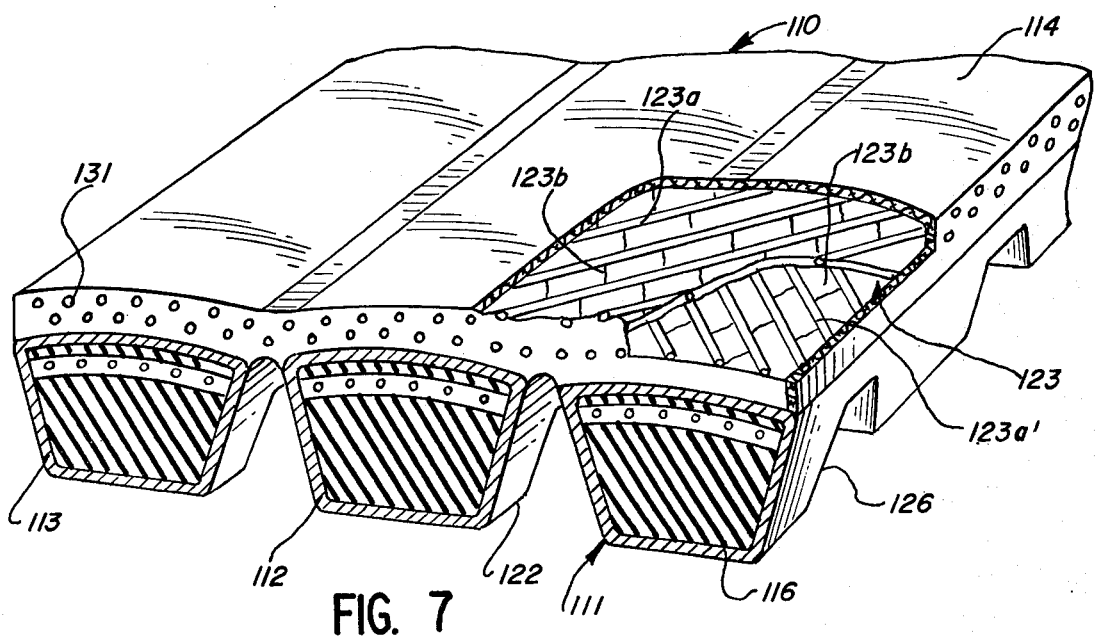
FIG. 7 is a fragmentary perspective view of another modified form of power transmission belt embodying the invention.

Belt A was a belt manufactured in accordance with the above disclosure and as illustrated in FIG. 3 of the drawing. Belt B was a belt having wrapped V-belt elements without grooves provided therein and utilizing an angled reinforcement in the tie band portion, such as illustrated in FIG. 7 of the drawing herein. Belt C was a belt similar to Belt A but having grooves such as shown in U.S. Pat. No. 3,626,775 of Kay V. Gentry discussed above.

In conducting the comparative tests, the different belts were caused to transmit approximately 100 horsepower, with a driving pulley rotating at approximately 1500 rpm, the driving pulley outside diameter being approximately 355 millimeters, the center-to-center distance of the pulleys being approximately 1079 millimeters, and the effective diameter of the driven pulley being approximately 530 millimeters. As can be seen from the table, the belt of the present invention provides a substantial improvement in crack resistance and belt life over that of the prior art belts.

In a modified form of the invention as illustrated in FIG. 7, the V-belt elements 111, 112 and 113 are similar to V-belt elements 11, 12 and 13, but are fully wrapped by a fabric layer 116. In this embodiment, the configuration illustratively may be one wherein the depth of the grooves 122 between the V-belt elements is approximately 20 millimeters, the depth of the transverse groove 126 is approximately 12 millimeters, the uniform pitch P between the sets of grooves is approximately 40 millimeters, the slant angle of the leading surface is approximately 50°, and the slant angle of the trailing surface is approximately 70°.

Further in the embodiment of FIG. 7, the tie band 114 is formed of a two-ply fabric 123 wherein the warp cords 123a and 123a' of the respective plies are maintained in association with each other by weak weft fibers 123b and 123b'. The warp cords may be formed of suitable strong material, such as cotton, polyamide, polyester, etc., and the woof cords are preferably formed of a relatively weak fine cotton material. The cord fabric is preferably rubber coated. As shown, the fabric layers are arranged with the crossing angle of the warp cords 123a, 123a' of the respective layers extending approximately 150° to each other. The angle of the warp cords illustratively is symmetrical about the longitudinal extent of the belt. A layer of elastomeric material 131 may be provided between the two fabric layers so as to prevent contact between the cords thereof and thereby effectively minimize stresses in the tie band as the belt passes around the pulleys. As in the embodiment of FIG. 3, the invention comprehends that the asymmetrical transverse grooves be arranged in aligned sets and the sets may be uniformly spaced as in FIG. 5, or randomly differently spaced as in FIG. 6.

Thus, the power transmission belt generally designated 110 of FIG. 7 is generally similar to the power transmission belt 10 of FIG. 3 and functions in a generally similar manner within the scope of the invention.

Thus, the invention comprehends the provision of an improved power transmission belt wherein the transverse grooves have asymmetrical longitudinal cross sections while being provided in sets of transversely aligned grooves wherein the leading surfaces are coplanar and the trailing surfaces are coplanar with each other. The spacing between the sets of grooves may be uniform or different from set to set and further illustratively may be randomly different within the scope of the invention. In the illustrated embodiment, the difference between the angles of the leading and trailing surfaces is in the range of approximately 2° to 30°. As indicated above, the invention is advantageously adapted for both raw edge belt design and wrapped belt design and is further advantageously adaptive with a wide range of tie band and V-belt element parameters.

The foregoing disclosure of specific embodiments is illustrative of the broad inventive concepts comprehended by the invention.

I claim:

1. In a power transmission belt having a plurality of V-belt elements retained in longitudinally extending laterally spaced relationship by a tie band, the improvement comprising the provision of longitudinally spaced grooves in said V-belt elements opening away from the tie band, the grooves of the respective V-belt elements being substantially aligned transversely of the belt, each of said grooves being defined by an inclined transverse leading surface, a reversely inclined transverse trailing surface, and a bottom surface, the inclination of said leading and trailing surfaces to the longitudinal extent of the tie band being different whereby the groove defines an asymmetrical configuration in longitudinal cross section.

2. The power transmission belt of claim 1 wherein said leading surface is inclined to said longitudinal extent of the tie band at a smaller angle than that of the trailing surface.

3. The power transmission belt of claim 1 wherein said leading surface is longer than the trailing surface.

4. The power transmission belt of claim 1 wherein said leading surface is inclined at an angle to said longitudinal extent in the range of approximately 30° to 75°.

5. The power transmission belt of claim 1 wherein said trailing surface is inclined at an angle to said longitudinal extent in the range of approximately 70° to 84°.

6. The power transmission belt of claim 1 wherein said leading surface is inclined at an angle to said longitudinal extent of approximately 60°.

7. The power transmission belt of claim 1 wherein said trailing surface is inclined at an angle to said longitudinal extent of approximately 80°.

8. The power transmission belt of claim 1 wherein said leading surface is inclined to said longitudinal extent of the tie band at an angle approximately 20° smaller than that of the trailing surface.

9. The power transmission belt of claim 1 wherein said grooves are arranged in transversely aligned sets, the pitch interval between each of the sets longitudinally of the belt being substantially equal.

10. The power transmission belt of claim 1 wherein said grooves are arranged in transversely aligned sets, the pitch interval between each of the sets longitudinally of the belt differing.

11. The power transmission belt of claim 1 wherein said grooves are arranged in transversely aligned sets, the pitch interval between each of the sets longitudinally of the belt differing randomly.

12. The power transmission belt of claim 1 wherein the leading surfaces of the transversely aligned grooves are coplanar.

13. The power transmission belt of claim 1 wherein the trailing surfaces of the transversely aligned grooves are coplanar.

14. The power transmission belt of claim 1 wherein said V-belt elements comprise raw edge elements.

15. The power transmission belt of claim 1 wherein said V-belt elements comprise elastomeric elements provided with transversely extending distributed fibers.

16. The power transmission belt of claim 1 wherein said V-belt elements comprise elastomeric elements provided with transversely extending distributed fibers, the distal surface of said elements remote from the tie band being covered with reinforcing fabric.

17. The power transmission belt of claim 1 wherein said tie band is provided with a fabric reinforcement formed of crimped yarn.

18. The power transmission belt of claim 1 wherein said tie band is provided with a filament reinforcement wherever the filaments cross at an angle in the range of 95° to 155°.

19. In a power transmission belt having a plurality of V-belt elements retained in longitudinally extending laterally spaced relationship by a tie band, the improvement comprising the provision of longitudinally spaced grooves in said V-belt elements opening away from the tie band, each of said grooves being defined by a transverse leading surface and a transverse trailing surface, the arrangement of said leading and trailing surfaces being different whereby the groove defines an asymmetrical configuration in longitudinal cross section.

20. The power transmission belt of claim 19 wherein said surfaces are planar and said leading surface is inclined to said longitudinal extent of the tie band at a smaller angle than that of the trailing surface.

* * * * *